May 13, 1952 C. J. VAN LOON ET AL 2,596,621
MAGNETIC RECORDING DEVICE
Filed March 4, 1950
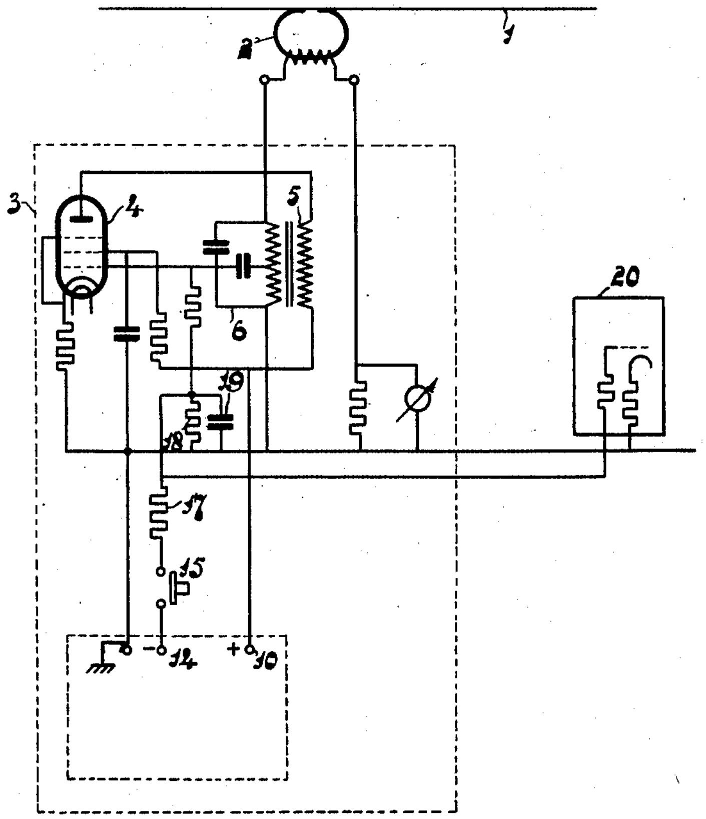
Carel Jan van Loon
Cornelis de Koning
Martin de Vroome
INVENTORS
BY Fred M Vogel
AGENT Patented May 13, 1952

2,596,621

UNITED STATES PATENT OFFICE 2,596,621

MAGNETIC RECORDING DEVICE

Carel Jan van Loon, Cornelis de Koning, and Marten de Vroome, Eindhoven, Netherlands, assignors to Hartford National Bank and Trust Company, Hartford, Conn., as trustee Application March 4, 1950, Serial No. 147,682
In the Netherlands March 16, 1949

3 Claims. (Cl. 179—100.2)

The invention relates to magnetic recording devices comprising a magnetic sound carrier, for example a magnetic strip or wire, which is fed relatively to recording means by which a magnetic quantity, for example the residual magnetism of the strip or wire is locally varied in accordance with electrical oscillations (which correspond with sound oscillations) supplied to the recording head. It is frequently desirable for the sound track thus provided on the sound carrier or at least part of this sound track to be removed and for this purpose provision is made of a second head, a so-called erasing head, which has supplied to it a superaudio-frequency oscillation which wipes out the sound track as far as the part of the sound carrier which is fed relatively to the erasing head is concerned. In addition, magnetic recording devices are known in which the electrical oscillations corresponding with the sound oscillations are mixed with a superaudio-frequency prior to supply to the recording head.

In the use of these magnetic recording devices for recording sound oscillations, for example a conversation, the recording head and the superaudio-frequency generator(s) are connected into circuit and the sound carrier is actuated. However, it has been found that the sound carrier records an oscillation, which, upon playing the sound carrier, becomes audible as a switching click. It has been found that this switching click is due to the control of the superaudio-frequency generator of the magnetic recording device, although this generator produces an oscillation exceeding the audible frequency range. This may be due to the fact that during the said control, the envelope of the superaudio-frequency oscillations exhibits an excessively rapid increase and decrease with time.

According to the invention, a magnetic recording device comprising at least one magnetic sound carrier, recording means and a controllable generator for superaudio-frequency oscillations which at least locally influences a magnetic quantity of the sound carrier, is characterized in that means are provided to ensure that the variation of the envelope of the oscillations produced by the superaudio-frequency generator is slower than 0.01 sec., for example is equal to 0.1 sec. thus bringing about suppression of an oscillation recorded on the sound carrier and corresponding to a switching click. This may be ensured, for example, by supplying to at least one of the electrodes, more particularly to the control-grid of a self-oscillating discharge tube producing the superaudio-frequency a positive supply voltage or alternately a negative bias voltage through a time-delay network having a time constant of at least 0.01 sec., for example in the neighbourhood of 0.1 sec.

In order that the invention may be more clearly understood and readily carried into effect, it will now be described more fully with reference to the accompanying diagrammatic drawing, given by way of example.

Referring now to the drawing, a sound carrier 1 of the magnetic type is provided, for example a strip or wire, on which a sound track is recorded with the use of recording means (recording head) (not shown). The strip may, for example, be used to record and reproduce conversations, after which, as a rule, the sound track corresponding to these conversations is required to be removed. Removal is effected by the device shown in the drawing comprising a so-called erasing head 2, which is supplied with superaudio-frequency oscillations of, for example, from 40 to 70 kc./s., from a generator 3. It is sometimes necessary to wipe out only part of the sound track recorded on the carrier and this also may be effected with the use of the device 2. The generator 3 comprises a discharge tube 4, the anode of which is regeneratively back-coupled to the grid circuit through a coupling 5 and a tuned circuit 6.

It is found that when this generator 3 is controlled, the sound carrier records an oscillation which when the sound carrier is played back becomes manifest as a switching click, although the frequency of the oscillations produced by the generator 3 exceeds the upper limit of audibility. Upon control of the generator hitherto described the amplitude of the oscillations produced will have reached its final value within a few periods only of the oscillation, so that the envelope of the high-frequency oscillations varies rapidly. To this the said switching click is found to be due.

Such clicks are avoided by providing means to ensure that the envelope of the oscillations produced by the generator 3 cannot but vary more slowly than 0.01 sec., for example with a period of 0.1 sec. only. For this purpose, for example, the following measures are taken.

The generator when in use is switched off with the use of a switch 15, this switch connecting a negative bias voltage source 14 into the control-grid circuit of the tube 4 through a time-delay network constituted by a resistance-capacity combination 17, 18, 19 with an open circuit time-constant of about 0.1 sec. Consequently the amplitude of the oscillations produced will gradually die out, so that a switching-off click of the generator is avoided. Similarly a switching-on click of the generator is avoided, since, upon interruption of the bias voltage connection by the switch 15 the switching-off time-constant of the network 18, 19 is also approximately 0.1 sec., so that the control-grid gradually assumes the voltage required for self-oscillation. The switching-on and switching-off clicks may be avoided in a similar manner by switching on the supply voltage of one of the electrodes, for example the screen-grid or the anode, through a time-delay network.

Similar measures may be taken, if the oscillation to be recorded on the sound carrier 1 is mixed with superaudio-frequency oscillations; in this case the generator 20 producing these oscillations must be designed such that the envelope of these oscillations varies slowly. It may, for example, be controlled by a switching circuit exactly similar to that shown under the references 14, 15, 17, 18, 19.

What we claim is:

1. In a magnetophone system provided with a magnetic sound carrier and means for impressing magnetically a sound recording on said carrier, apparatus to erase said recording comprising a magnetic head disposed adjacent said sound carrier, and a generator for supplying electrical oscillations having a supersonic frequency to said head, said generator being provided with a delayed switching system for activating and deactivating said generator from zero to a final amplitude value of oscillations and conversely within a period not less than one hundredth of a second, whereby switching clicks in said sound recording are avoided.

2. In a magnetophone system provided with a magnetic sound carrier and means for impressing magnetically a sound recording on said carrier, apparatus for erasing said impressed sound recording in said carrier comprising a magnetic head disposed adjacent said carrier, and a generator for supplying electrical oscillations having a supersonic frequency to said head, said generator being provided with an electron-discharge tube having a cathode, a control grid and an anode, a regenerative circuit coupled to the electrodes of said tube to sustain oscillations therein, a time-delay network and switching means to apply a cut-off bias to said grid through said network to suppress said oscillations, said network having a time constant of at least 0.01 seconds.

3. Magnetophone apparatus comprising a magnetic sound carrier, recording means for impressing magnetically a sound recording on said carrier, and erasing means for erasing said impressed sound recording on said carrier, said erasing means including a magnetic head disposed adjacent said carrier and a generator for supplying electrical oscillations having a supersonic frequency to said erasing head, said generator being provided with an electron-discharge tube having a cathode, a control grid and an anode, a regenerative circuit coupled to the electrodes of said tube to sustain oscillations therein, a time-delay network having a time constant of 0.1 seconds, a source of cut-off bias for said tube, and means including a switch to connect said source to the control grid of said tube through said network to suppress said oscillations.

CAREL JAN VAN LOON.
CORNELIS DE KONING.
MARTEN DE VROOME.

No references cited.